United States Patent
Bellet et al.

(10) Patent No.: US 11,891,965 B2
(45) Date of Patent: Feb. 6, 2024

(54) TURBOJET ENGINE NACELLE WITH A CASCADE THRUST REVERSER COMPRISING A FLAP CONTROL SECTOR

(71) Applicant: Safran Nacelles, Gonfreville l'Orcher (FR)

(72) Inventors: François Bellet, Moissy Cramayel (FR); Jérôme Corfa, Moissy Cramayel (FR); Julien Van Den Driessche, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 5 days.

(21) Appl. No.: 17/205,172

(22) Filed: Mar. 18, 2021

(65) Prior Publication Data
US 2021/0207558 A1 Jul. 8, 2021

Related U.S. Application Data

(63) Continuation of application No. PCT/FR2019/052124, filed on Sep. 13, 2019.

(30) Foreign Application Priority Data

Sep. 18, 2018 (FR) ...................................... 18/58429

(51) Int. Cl.
*F02K 1/72* (2006.01)
*F02K 1/76* (2006.01)

(52) U.S. Cl.
CPC ................ *F02K 1/72* (2013.01); *F02K 1/763* (2013.01); *F05D 2220/323* (2013.01); *F05D 2260/52* (2013.01); *F05D 2270/051* (2013.01)

(58) Field of Classification Search
CPC ...... F02K 1/72; F02K 1/763; F05D 2220/323; F05D 2260/52; F05D 2270/051
See application file for complete search history.

(56) References Cited

U.S. PATENT DOCUMENTS

| 2010/0139242 A1* | 6/2010 | Vauchel | F02K 1/763 74/89.17 |
| 2011/0296813 A1* | 12/2011 | Frank | F02K 1/30 60/230 |

(Continued)

FOREIGN PATENT DOCUMENTS

| EP | 2868908 | 5/2015 |
| FR | 2952128 | 5/2011 |

(Continued)

OTHER PUBLICATIONS

International Search Report for International Application PCT/FR2019/052124, dated Dec. 17, 2019.

(Continued)

*Primary Examiner* — Andrew H Nguyen
(74) *Attorney, Agent, or Firm* — Burris Law, PLLC

(57) ABSTRACT

A turbofan engine nacelle includes a thrust reverser system provided with at least one movable cowl retracting towards a rear reverse-jet position, tilting pivoting flaps which at least partially close an annular flow duct, and opening lateral openings of this annular flow duct equipped with reverser grids. Each movable cowl includes a control sector that slides in a transverse plane, a deflection device linking a fixed part of the nacelle to this control sector in order to make it slide towards a reversal position when the movable cowl retracts, and flap connecting rods linking this control sector to the pivoting flaps, which tilt these flaps, closing the annular flow duct, when the control sector slides towards its reversal position.

27 Claims, 6 Drawing Sheets

(56) References Cited

U.S. PATENT DOCUMENTS

| | | | |
|---|---|---|---|
| 2012/0138707 A1* | 6/2012 | Vauchel .................. | F02K 1/763 239/265.29 |
| 2016/0160799 A1 | 6/2016 | Gormley | |
| 2021/0108594 A1* | 4/2021 | Song ....................... | F02K 1/763 |

FOREIGN PATENT DOCUMENTS

| | | |
|---|---|---|
| RU | 2133861 | 7/1999 |
| RU | 2499904 | 11/2013 |

OTHER PUBLICATIONS

Search Report appended to Decision to Grant in RU Application No. 2021105332, completed Nov. 24, 2022, 2 pages.

* cited by examiner

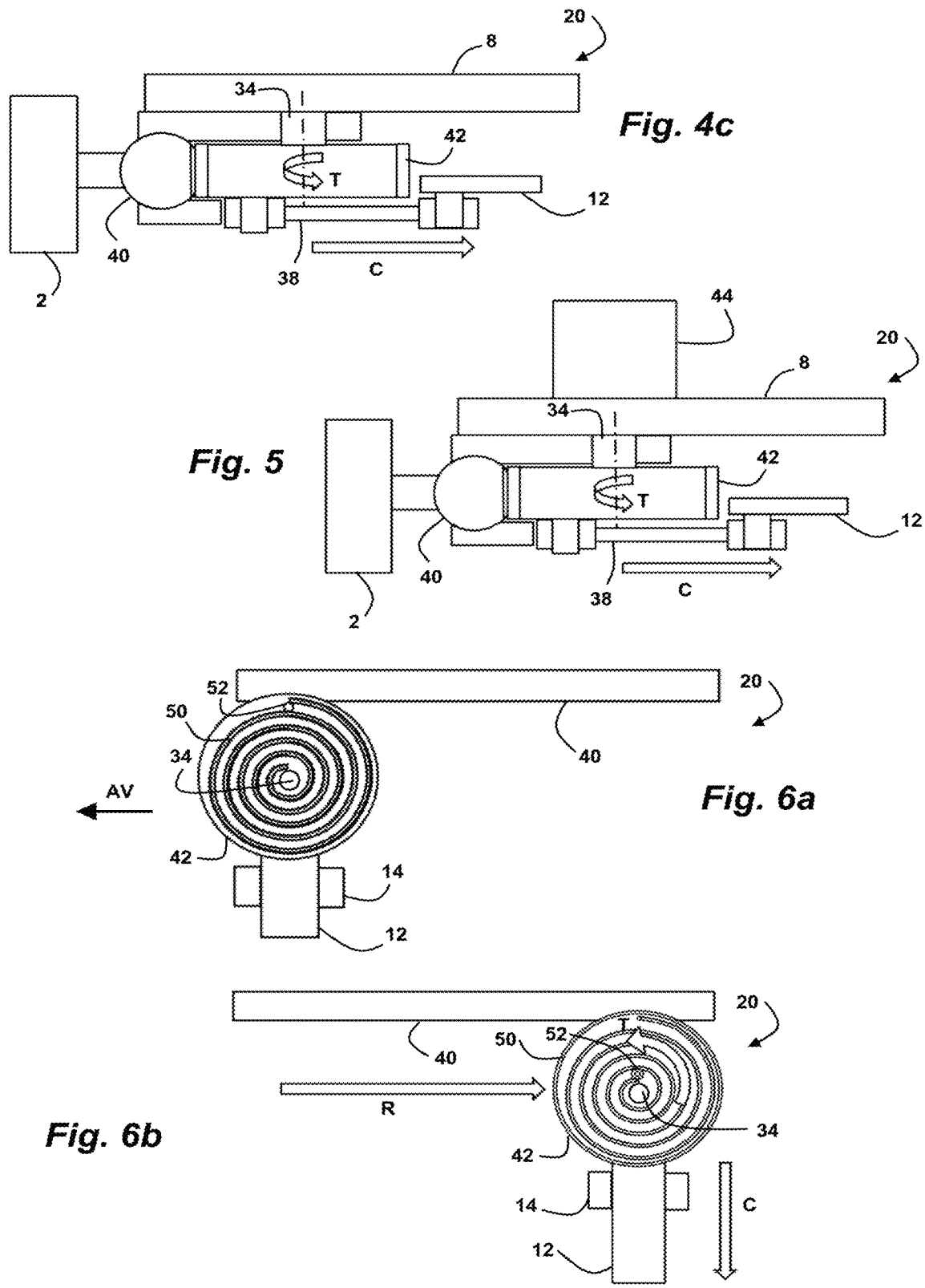

TURBOJET ENGINE NACELLE WITH A CASCADE THRUST REVERSER COMPRISING A FLAP CONTROL SECTOR

CROSS-REFERENCE TO RELATED APPLICATIONS

This application is a continuation of International Application No. PCT/FR2019/052124, filed on Sep. 13, 2019, which claims priority to and the benefit of FR 18/58429 filed on Sep. 18, 2018. The disclosures of the above applications are incorporated herein by reference.

FIELD

The present disclosure relates to a bypass turbojet engine nacelle including a cascade thrust reverser delivering a cold air flow forward.

BACKGROUND

The statements in this section merely provide background information related to the present disclosure and may not constitute prior art.

Turbojet engines for motorizing aircraft, disposed along a longitudinal axis and surrounded by a nacelle, receive fresh air from the front side, and reject from the rear side the hot gases produced by combustion of the fuel generating thrust.

The bypass turbojet engines include fan blades disposed in a ring around the engine, generate a considerable secondary flow of cold air along an annular flow path passing between this engine and the nacelle, which adds high thrust.

Some nacelles include a thrust reverser system equipped with pivoting flaps at least partially closing the cold air annular flow path, to direct the secondary flow radially outwards through lateral openings of the nacelle which open, by directing it forwards in order to generate a reverse thrust for braking the aircraft.

A known type of cascade thrust reverser, presented in particular by the U.S. Published Application No. 2016/0160799, includes rear movable cowls sliding axially rearwards under the effect of cylinders, to open movable structure of the nacelle containing cascades. The pivoting flaps are connected by tie-rods to a fixed front frame, to operate these flaps when the movable cowls are retracted. This solution is not applicable in the absence of a front frame.

Another known type of cascade thrust reverser includes tie-rods connecting the pivoting flaps to the fixed internal structure of the annular flow path, called "inner fixed structure," or "IFS" for short, which tilt the pivoting flaps driven rearward by the retraction of the movable cowls.

The control tie-rods of the pivoting flaps passing through the cold air annular flow path, may pose performance problems when the reverser is in the direct jet position, because of the aerodynamic losses they generate in this annular flow path.

SUMMARY

This section provides a general summary of the disclosure and is not a comprehensive disclosure of its full scope or all of its features.

The present disclosure provides an engine nacelle of the bypass turbojet engine type disposed along a main axis, comprising starting from a front side an annular flow path for receiving fresh air from a fan, and a thrust reverser system device having at least one cowl axially movable between a direct jet front position, and a reverse jet rear position which tilts pivoting flaps by at least partially closing the annular flow path, and which opens lateral openings of the annular flow path upstream of the pivoting flaps, equipped with thrust reverser cascades returning a cold air flow towards the outside forwards. The nacelle is remarkable in that each movable cowl includes a control sector sliding in a plane transverse relative to the main axis, includes a return device connecting a fixed portion of the nacelle to the control sector to make it slide towards an reversal position when the movable cowl is recoiled, and includes flap tie-rods connecting the control sector to the pivoting flaps disposed in front of a movable cowl, which tilt these flaps by closing the annular flow path when the control sector is sliding towards its reversal position.

An advantage of this nacelle is that the control of all the pivoting flaps distributed in front of each cowl is effected by means of a single control sector fixed on this cowl, sliding in the tangential direction, which is controlled at its ends by a return device attached to a fixed portion of the nacelle. The flap tie-rods remain outside the annular flow path, avoiding having a tie-rod for each flap that would pass through the fresh air flow. In this way, there is no need for a fixed front frame on the middle section of the nacelle in front of the cowls, and the aerodynamic efficiency of the nacelle is optimized.

The nacelle according to the present disclosure may further include one or more of the following features, which can be combined with one another.

Advantageously, each flap tie-rod includes a play take-up system comprising two axial portions sliding one relative to the other, equipped with an intermediate spring. This arrangement makes it possible to cancel play of the flaps in the direct jet position.

Advantageously, each flap includes a safety hook fixed to the control sector, which secures the position by applying to the flap in the direct jet position a force parallel to the movement of this flap. This hook is engaged and released automatically when the control sectors slide.

Advantageously, each control sector includes guides fixed to the cowl supporting it, allowing a movement of this control sector in a circumferential direction.

In particular, each control sector can include a return device at each of its ends. A double actuation of the control sectors is obtained which ensures safety.

According to a form of the present disclosure, the nacelle includes a return device comprising a return plate fixed to the cowl by a cowl pivot, which is connected to the fixed portion of the nacelle by a primary tie-rod and to the control sector by a secondary tie-rod.

According to another variant, the nacelle includes a return device comprising a rack linked to the fixed portion and disposed parallel to the main axis, and a pinion engaged on this rack, linked to a cowl.

In this case, the return device may include a secondary tie-rod connecting the pinion to the control sector, or in a variant the pinion can drive a cam receiving a connecting pin connected to the control sector, or may drive a pinion of an angle connected to the control sector by a screw-nut system.

According to another variation, the nacelle includes a return device comprising a cam receiving a connecting pin, one of these elements sliding axially during the recoil movement of the cowl, the other element being connected to the control sector to drive it.

According to another form, the nacelle includes a return device comprising a cable fixed to the control sector in a transverse direction, passing on each side of this sector by a pulley connected to the cowl by taking an axial direction, rearwards on one side and forwards on the other side, to be then fixed to a fixed portion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4c is an illustrative diagram of the return device of FIG. 4a, presented from above in an axial section along a section plane IVc-IVc in the direct jet position, according to the present disclosure;

FIG. 5 is an illustrative diagram in axial section of the return device of FIGS. 4a, 4b, and 4c equipped with a motorization variation, according to the present disclosure;

FIG. 6a is an illustrative diagram of an example rotating cam return device, presented in a top view with the direct jet position, according to the present disclosure;

FIG. 6b is an illustrative diagram of the rotating cam return device of FIG. 6a, presented in the top view with the reverse jet position, according to the present disclosure;

Figure 10A:
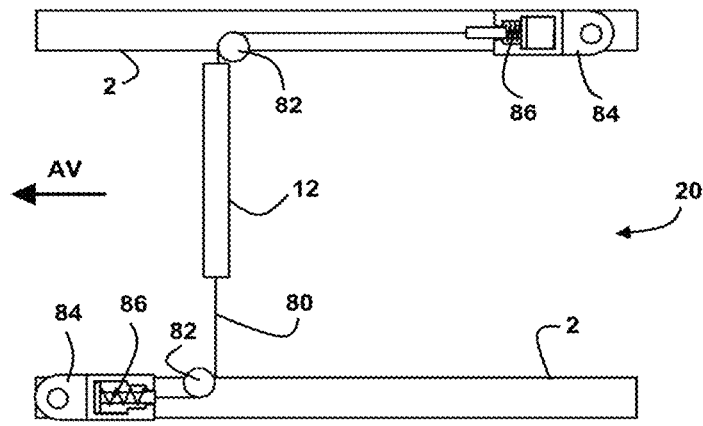
FIG. 10a is an illustrative diagram of an example cable return device, presented in the direct jet position according to the present disclosure.
Figure 10B:
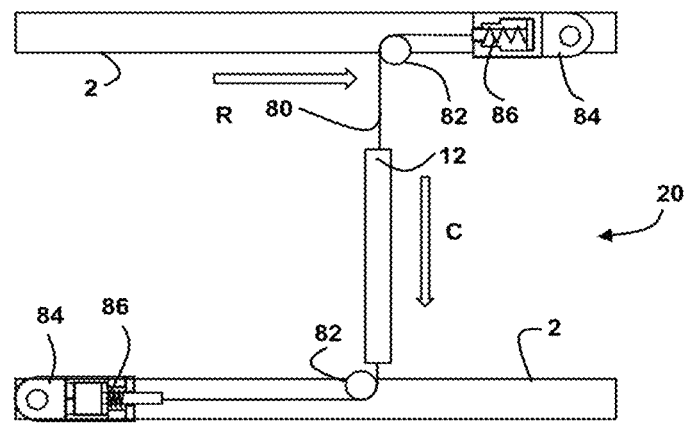
Figure 11A:
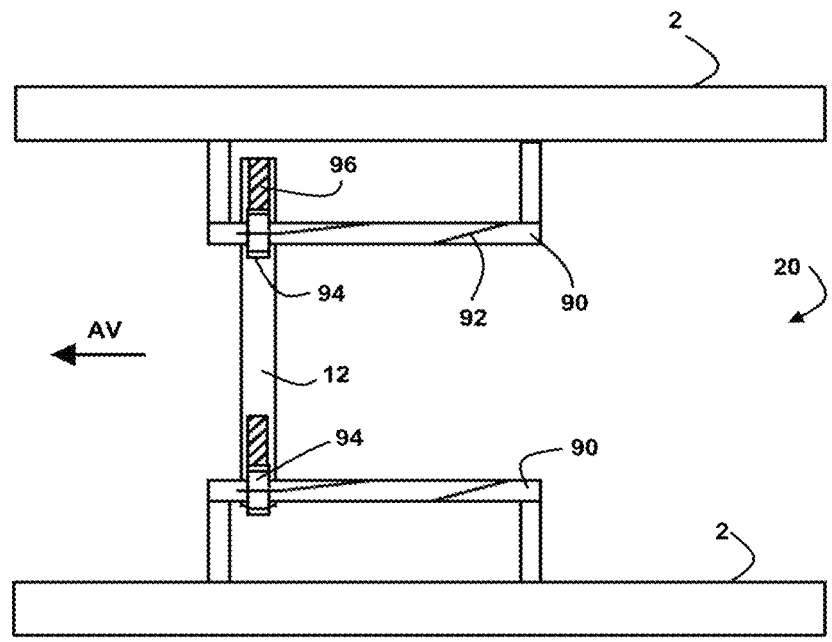
Figure 11B:
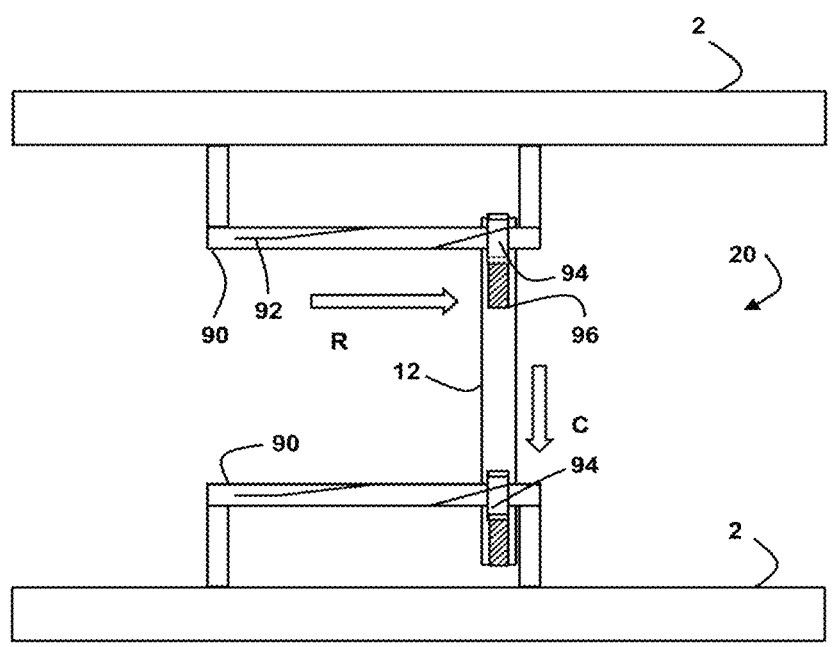

FIG. 10b an illustrative diagram of the cable return device of FIG. 10a, presented in the reverse jet position, according to the present disclosure;

FIG. 11a is an illustrative diagram of an example cylindrical cam return device, presented in the direct jet position, according to the present disclosure; and FIG. 11b is an illustrative diagram of the cylindrical cam return device of FIG. 11a, presented in the reverse jet position, according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIGS. 1a, 1b, 2a and 2b show the rear section of a nacelle comprising a thrust reverser, disposed along a main axis, comprising upper and lower fixed beams 2 linked to the aircraft, supporting by a connection disposed in a vertical axial plane 4 an inner fixed structure 6 enveloping the turbojet engine.

An annular flow path 18 disposed around the inner fixed structure, is framed on each side of the nacelle by a movable cowl 8 sliding rearward.

Figure 1A:
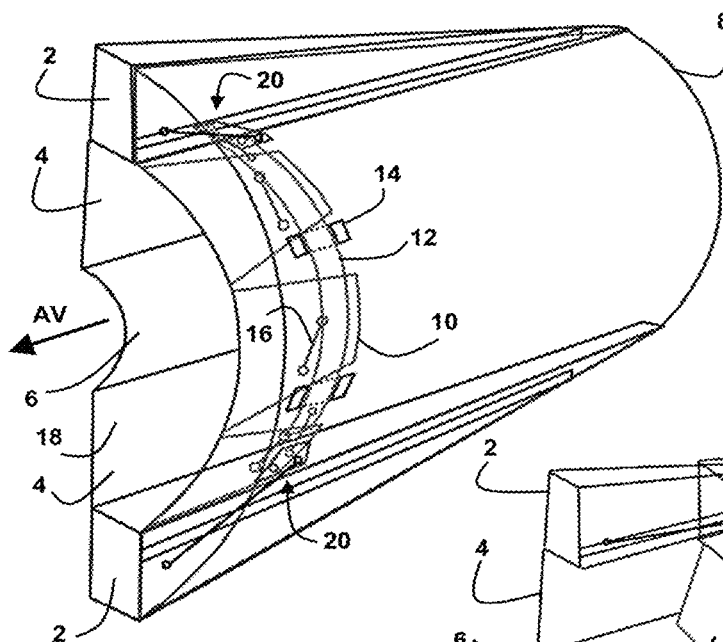
FIG. 1a is an illustrative diagram of an example thrust reverser system for an example nacelle, presented successively in a direct jet position, according to the present disclosure.
Figure 1B:
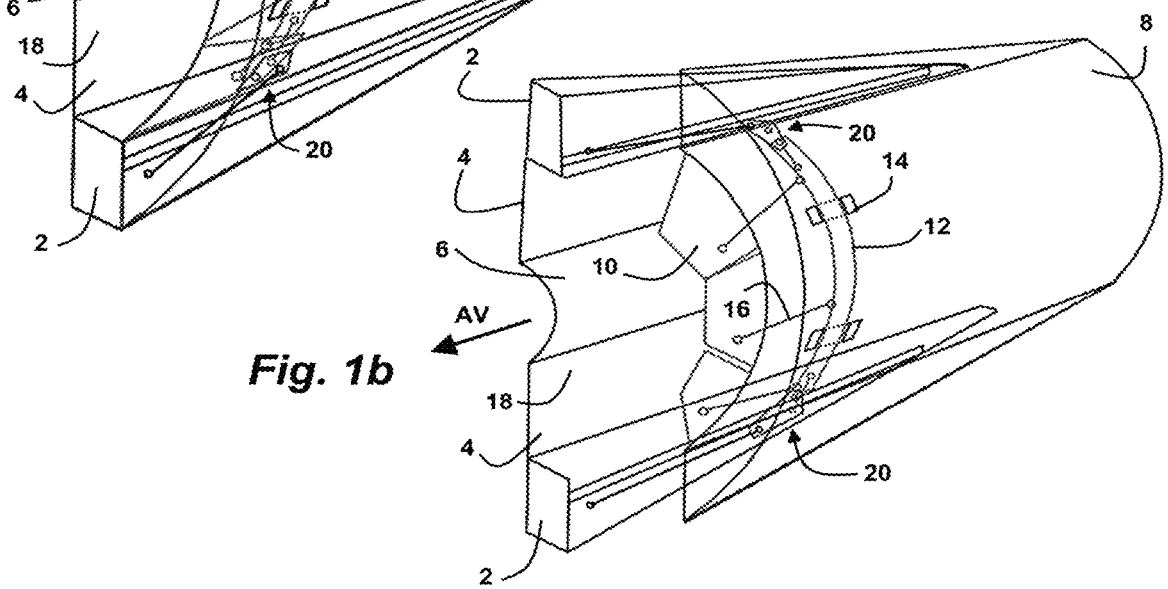
FIG. 1b is an illustrative diagram of the thrust reverser system in FIG. 1 in a reverse jet position, according to the present disclosure.
Figure 2A:
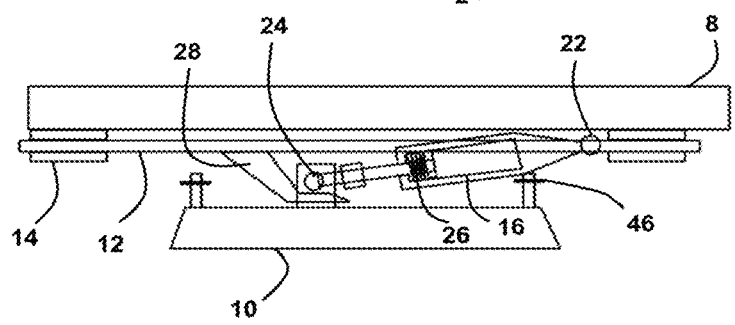
FIG. 2a is an illustrative diagram of a front side view of an example pivoting flap of the thrust reverser system, presented in the direct jet position, according to the present disclosure.
Figure 2B:
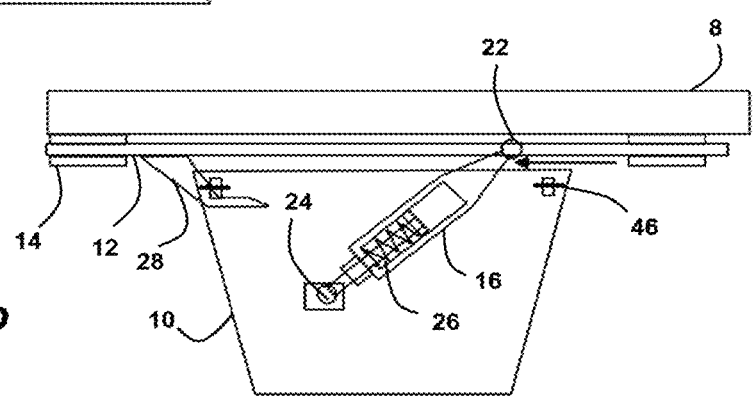
FIG. 2b is an illustrative diagram of the pivoting flap of the thrust reverser system of FIG. 2a, presented in the reverse jet position, according to the present disclosure.

Each movable cowl 8 supports substantially at its front end, pivoting flaps 10 each having a pivot axis 46 fixed towards the front of this cowl in a tangential direction, in order to tilt inward when coming on the inner fixed structure 6 as shown in FIG. 1b, to close the annular flow path 18.

A control sector 12 forming an elongated and curved bar, held inside each cowl 8 in a transverse plane by guides 14 to slide in a tangential direction, covers a major angular portion of this cowl, following a sector close to 180°.

Each end of the control sector 12 is connected to the lower or upper fixed beam 2 by a return device 20, which when the cowl 8 recoils along the arrow R, drives this sector to slide downward along the arrow C by following guides 14.

As a variant, the two control sectors 12 of the two cowls 8 can both slide upwards, or in the same direction of clockwise or anti-clockwise rotation, one starting down and the other up.

Each pivoting flap 10 in front of a cowl 8, is connected to the control sector 12 of this cowl by a tie-rod 16 comprising a ball joint 22, 24 at each end, for during the sliding C of this sector driving the tilting of this flap radially inward.

In the direct jet position, each tie-rod 16 is close to the tangential alignment position, the ball joint 24 linked to the flap 10 being slightly offset radially towards the axis of the nacelle relative to the other ball joint 22.

When moving to the reverse jet position, the sliding C of the control sector 12 acting on each tie-rod 16, moves its flap ball joint 24 in the radial direction towards the axis of the nacelle, by driving its flap 10 which pivots in closing.

Advantageously, the ball joint 24 linked to the flap 10 is in the reverse jet position, at the bottom of this flap in the direction of the main axis of the nacelle, which gives a significant lever arm increasing the stroke but reducing the port on the connecting rod 16.

The jet is then directed towards thrust reverse cascades, not represented, disposed in the lateral openings of the annular flow path 18 released in front of the cowls 8 which have recoiled.

Each tie-rod 16 includes a play take-up system comprising two axial portions sliding relative to each other, equipped with an intermediate spring 26 working in compression, which when opening the flap 10 is compressed at the end of the sliding of the control sector 12 in order to ensure that, in direct jet, this flap is properly blocked bearing its end stop to prevent a play.

A safety hook 28 fixed radially inside the control sector 12, comes in the direct jet position under the flap ball joint 24 of the tie-rod 16 in order to secure the direct jet position of the flap 10 by applying a pretension on this flap, and by avoiding its unexpected closing. The movement of the control sector 12 towards the reverse jet position automatically releases this safety hook 28 to allow the flap 10 to tilt.

Figure 3A:
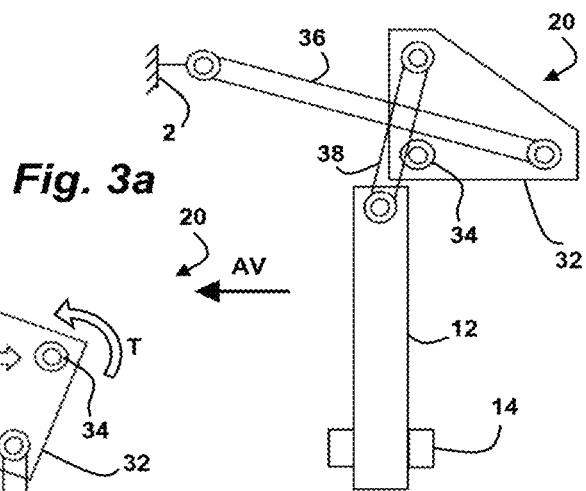
FIG. 3a is an illustrative diagram of an example tie-rod return device, presented in the direct jet position, according to the present disclosure.

FIG. 3a shows a return device 20 comprising a return plate 32 disposed in a tangential plane around the main axis, fixed to the cowl 8 by a cowl pivot 34, connected to the fixed beam 2 by a primary tie-rod 36 and to the control sector 12 by a secondary tie-rod 38. Each tie-rod 36, 38 includes an articulation at each end to allow their deflections in the tangential plane of the return plate 32.

The primary tie-rod 36 is fixed to the return plate 32 at a point axially behind the cowl pivot 34. The secondary tie-rod 38 is fixed to the return plate 32 in the tangential direction at a point opposite of the control sector 12 relative to the cowl pivot 34.

Figure 3B:
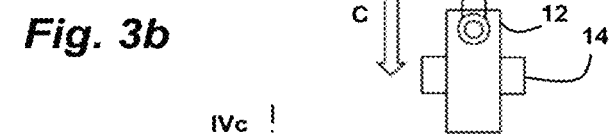
FIG. 3b is an illustrative diagram of the tie-rod return device of FIG. 3a, presented in the reverse jet position, according to the present disclosure.

FIG. 3b shows the recoil R of the cowl 8 and the cowl pivot 34. The primary tie-rod 36 rotates, at an angle indicated by the arrow T, the return plate 32 around the cowl pivot 34, with an angle a little less than 180°, which drives the secondary tie-rod 38 in a substantially tangential movement causing the control sector 12 to slide along the sliding C. A simultaneous closing of all the flaps 10 connected to this control sector 12 is obtained.

Figure 4A:
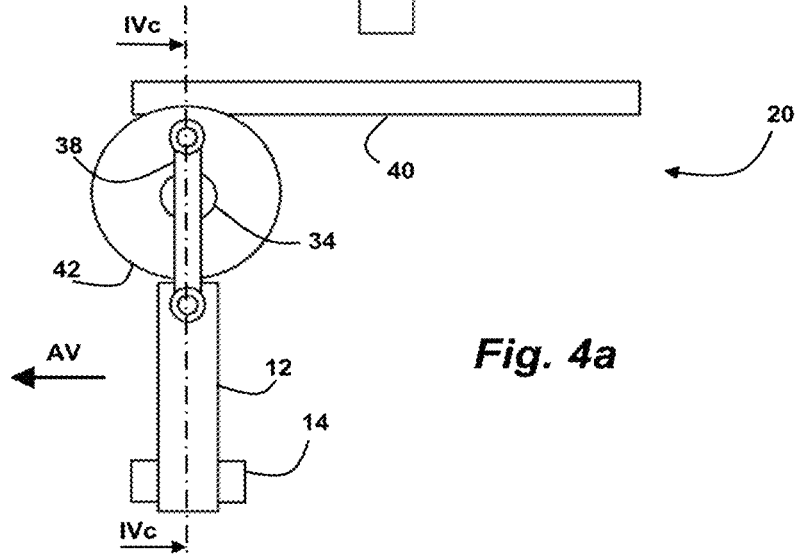
FIG. 4a is an illustrative diagram of an example return device following a rack variant, presented from above with the direct jet position, according to the present disclosure.

FIGS. 4a and 4c show a return device 20 comprising a rack 40 connected to the fixed beam 2, a pinion 42 carried by a cowl pivot 34 being engaged on this rack.

A secondary tie-rod 38 disposed substantially tangentially, is connected on one side to the control sector 12, and on the other side to the pinion 42 at a point opposite to this control sector relative to the cowl pivot 34.

Figure 4B:
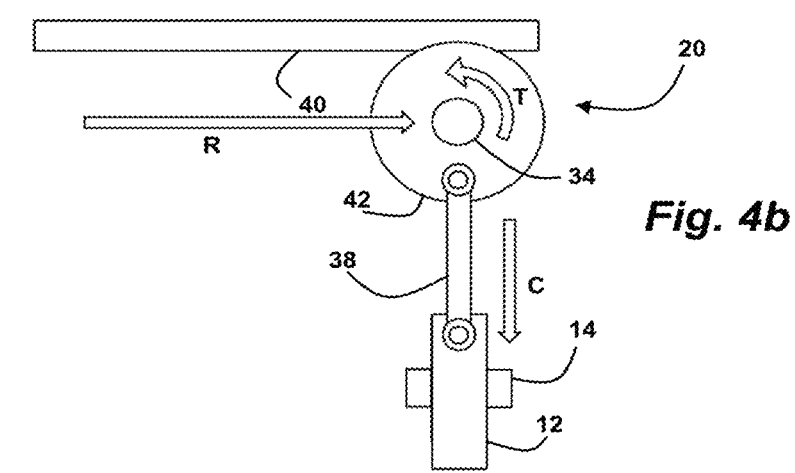
FIG. 4b is an illustrative diagram of the return device of FIG. 4a, presented from above with the reverse jet position, according to the present disclosure.

FIG. 4b shows the recoil R of the cowl 8 and of the cowl pivot 34. The pinion 42 rotates on the rack 40 at an angle indicated by the arrow T, the secondary tie-rod 38 performs a substantially tangential movement causing the control sector 12 to slide following the sliding C. A closing of the flaps 10 is obtained.

FIG. 5 shows a motorization 44 fixed on the cowl 8 directly driving the pinion 42 in rotation, which allows, by its actuation by bearing on the rack 40, both to recoil this cowl and to tilt the flaps 10. The motorization 44 performs the complete driving of the thrust reverser, which avoids the use of cylinders to maneuver the cowl 8 and its pivoting flaps 10.

Figure 6C:
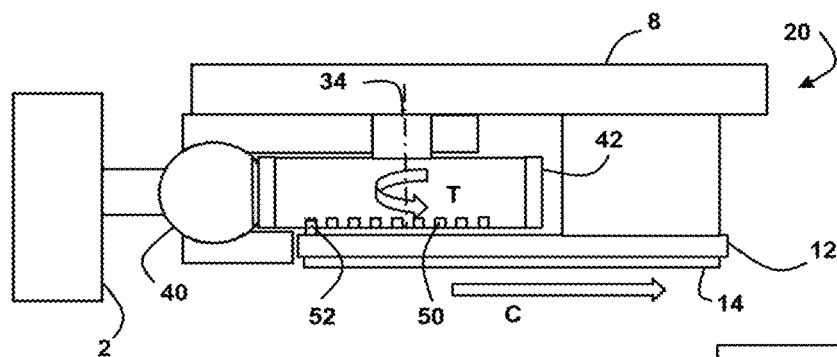
FIG. 6c is an illustrative diagram of the rotating cam return device of FIG. 6a, presented in the top view in axial section along a section plane VIc-VIc in the direct jet position, according to the present disclosure.

FIGS. 6a and 6c show a return device 20 comprising a rack 40 connected to the fixed beam 2, and a pinion 42 carried by a cowl pivot 34, which is engaged on the rack 40.

The pinion 42 includes on its underside opposite the cowl 8 a spiral groove forming a cam 50, receiving a connecting pin 52 fixed to the end of the control sector 12.

FIG. 6b shows the recoil R of the cowl 8 and of the cowl pivot 34, which rotates the cam 50 along the angle T, by driving the connecting pin 52 which remains in a given radial direction of this cam by the sliding of the control sector 12. The connecting pin 52 is approached to the axis of the cam 50 by following the spiral of its groove, giving the sliding C of the control sector 12.

The cam 50 makes it possible, by modifying its angle at the start and at the finish in relation to the tangent direction of the pinion 42, to obtain variable drive speeds at the start and at the end of the closing of the flaps 10. It is possible in particular to achieve smooth starts and stops, as well as blocking the flaps 10 by giving the cam 50 a tangent direction.

Figure 7:
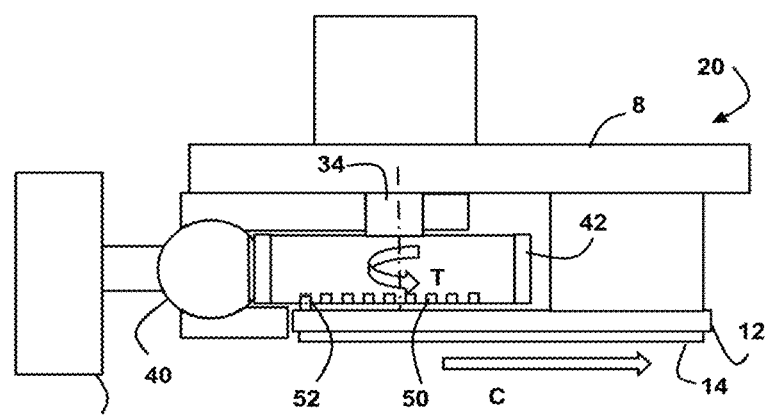
FIG. 7 is an axial section diagram of the return device of FIGS. 6a, 6b, and 6c equipped with a motorization, according to the present disclosure.

FIG. 7 shows a motorization 44 fixed on the cowl 8 directly driving the pinion 42 carrying the cam 50 in rotation, which allows by its actuation by bearing on the rack 40, both to recoil this cowl and to tilt the flaps 10.

Figure 8A:
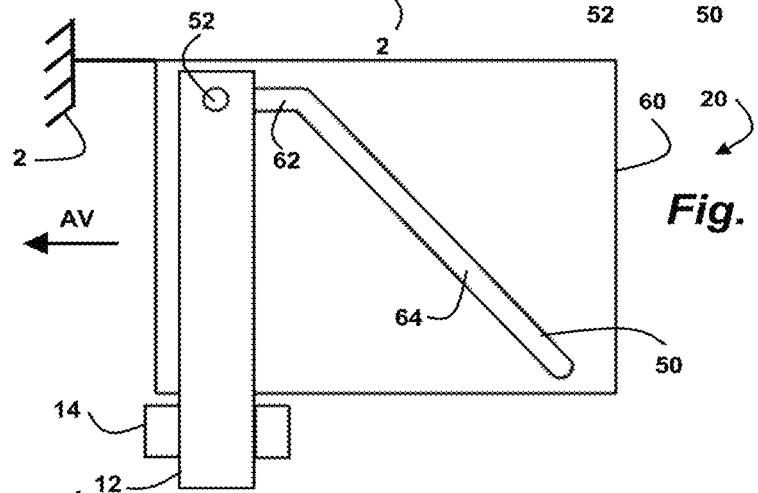
FIG. 8a is an illustrative diagram of an example translational cam return device, presented in the direct jet position, according to the present disclosure.

FIG. 8a shows a return device 20 comprising a plate 60 disposed in a tangential plane relative to the main axis, having a groove comprising an axial portion 62 then an inclined portion 64, forming a cam 50 receiving a connecting pin 52 fixed to the end of the control sector 12.

Figure 8B:
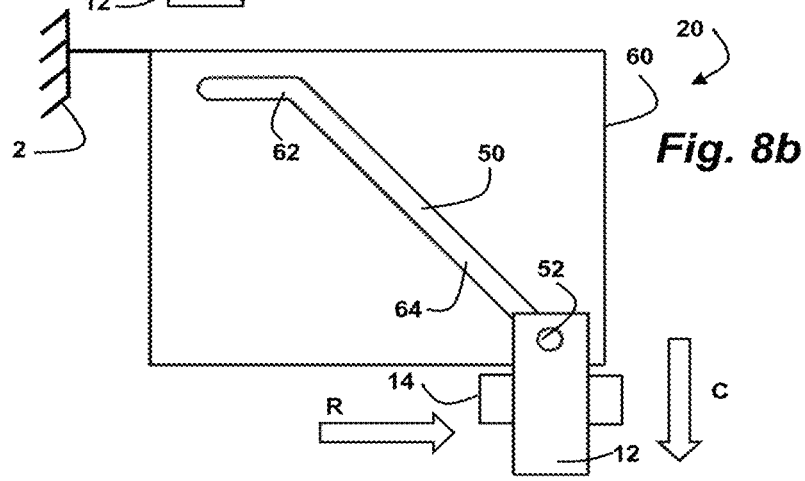
FIG. 8b is an illustrative diagram of the translational cam return device of FIG. 8a, presented in the reverse jet position, according to the present disclosure.

FIG. 8b shows the recoil R of the cowl 8 and of the control sector 12, the plate 60 with its cam 50 remaining fixed, which causes the displacement of the connecting pin 52 in the transverse direction, and the sliding C of this control sector.

As for the return device 20 shown in FIG. 6a, it is possible to provide for different slopes of the cam 50 at the start and at the end to obtain variable drive speeds at the start and at the end, as well as a blocking of the flaps 10.

Figure 9A:
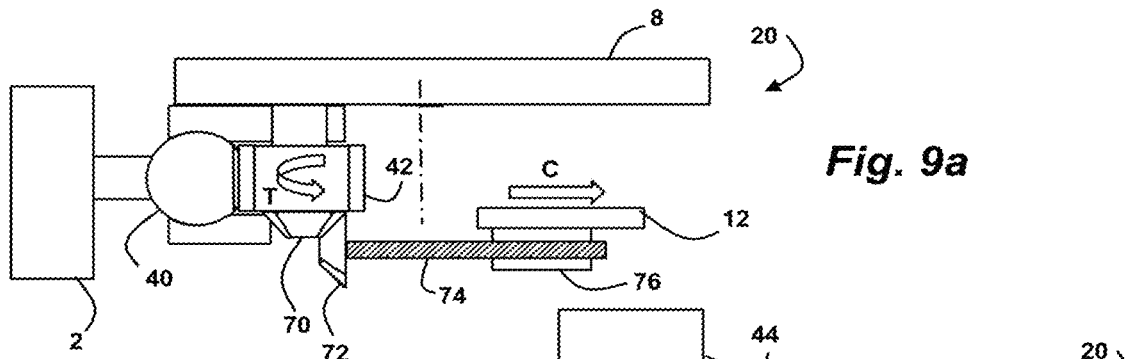
FIG. 9a is an illustrative diagram of an example rack return and angle return device in the direct jet position, presented without motorization, according to the present disclosure.

FIG. 9a shows a return device 20 comprising a rack 40 connected to the fixed beam 2, and a pinion 42 carried by a cowl pivot, which is engaged on the rack 40.

The pinion 42 includes on its lower face opposite the cowl 8, a first bevel pinion 70 which meshes with a second bevel pinion 72 fixed to the end of a screw 74 disposed in the extension of the control sector 12, which is engaged in a nut 76 fixed on the side of this control sector.

The recoil of the cowl 8 and of the cowl pivot causes the pinion 42 and the first bevel pinion 70 to rotate at an angle T, which rotates the second bevel pinion 72 forming an angle, and the screw 74. The nut 76 is displaced axially on the screw 74, by causing the sliding C of the control sector 12.

Figure 9B:
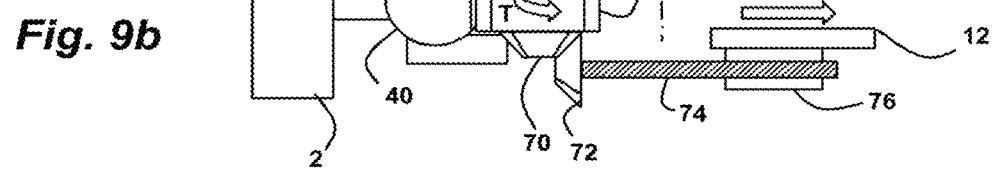
FIG. 9b is an illustrative diagram of the rack return and angle return device of FIG. 9a in the direct jet position, presented with a motorization variation, according to the present disclosure.

FIG. 9b shows a motorization 44 fixed to the cowl 8 directly driving the pinion 42 carrying the first bevel pinion 70 in rotation, which makes it possible, by its actuation, by bearing on the rack 40, to both recoil this cowl and to tilt the flaps 10.

FIG. 10a shows a return device 20 comprising a cable 80 fixed along the control sector 12, passing beyond each end of this sector by a pulley 82 linked to the cowl 8.

After each pulley 82 the cable follows an axial direction, rearwards on one side and forwards on the other side, to be fixed at its end by a clip 84 to a fixed beam 2. Each clip 84 is linked to the cable 80 by a spring 86 working in compression, so as to take up play and to ensure a constant tension of this cable.

FIG. 10b shows a recoil R of the cowl 8 and the control sector 12, causing the unwinding of the cable 80 on the pulleys 82, which gradually passes from the upper beam 2 to the lower beam on the other side, by causing transversely the sliding movement C of the control sector fixed to this cable.

FIG. 11a shows a return device 20 comprising a cylindrical cam 90 fixed parallel to each beam 2, including a helical groove 92, each passing through a central bore of a pinion 94 having a connecting pin engaged in this groove. The control sector 12 supporting the two pinions 94, includes a rack 96 engaged on these pinions.

FIG. 11b shows a recoil R of the cowl 8 and of the control sector 12, causing the rotation of each pinion 94 coming from its pin engaged in a helical groove 92, which gives the transverse sliding C of the rack 96 and of the control sector.

The nacelle according to the present disclosure makes it possible for each movable cowl 8 to have a single part forming the control sector 12, sliding transversely using different return devices which are not limited to those described above by way of example, to control all the flaps 10 located under this cowl 8 without passing through the annular flow path. Advantageously, a control sector 12 is placed on each cowl 8 of a reverser with two cowls arranged symmetrically on each side of an axial plane of the nacelle.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An engine nacelle of a bypass turbojet engine type disposed along a main axis, the engine nacelle comprising:
a thrust reverser system having at least one movable cowl movable axially between a direct jet front position and a reverse jet rear position which tilts a plurality of pivoting flaps while at least partially closing an annular flow path, and which opens lateral openings of the annular flow path upstream of the plurality of pivoting flaps, equipped with thrust reverser cascades returning a cold air flow towards outside forwards, wherein each movable cowl includes:
a control sector sliding in a transverse plane relative to the main axis;
a return device connecting a fixed portion of the engine nacelle to the control sector to slide the control sector to a reversal position when the at least one movable cowl is recoiled; and
a plurality of flap tie-rods connecting the control sector to the plurality of pivoting flaps disposed in front of the at least one movable cowl and movable by the control sector, the plurality of flap tie-rods tilting the plurality of pivoting flaps by closing the annular flow path upon movement by the control sector when sliding the control sector towards the reversal position,
wherein each flap of the plurality of flaps includes a safety hook fixed to the control sector, the safety hook securing the reversal position by applying on the flap in the direct jet position, a force parallel to a movement of the flap.

2. The engine nacelle according to claim 1, wherein each flap tie-rod includes a play take-up system comprising at least two axial portions sliding relative to each other, equipped with an intermediate spring.

3. The engine nacelle according to claim 1, wherein the control sector includes guides fixed to the at least one movable cowl, allowing a movement of the control sector according to a circumferential direction.

4. The engine nacelle according to claim 1, wherein each control sector includes the return device at each end of the control sector.

5. The engine nacelle according to claim 1, wherein the return device comprises a return plate fixed to the at least one movable cowl by a cowl pivot, the return plate being connected to the fixed portion of the nacelle by a primary tie-rod and to the control sector by a secondary tie-rod.

6. The engine nacelle according to any claim 1, wherein the return device comprises a rack linked to the fixed portion and disposed parallel to the main axis, and a pinion engaged on the rack, linked to the at least one movable cowl.

7. The engine nacelle according to claim 6, wherein the return device includes a secondary tie-rod connecting the pinion to the control sector.

8. The engine nacelle according to claim 6, wherein the pinion drives a cam receiving a connecting pin connected to the control sector.

9. The engine nacelle according to claim 6, wherein the pinion drives a pinion at an angle connected to the control sector by a screw-nut system.

10. The engine nacelle according to claim 1, wherein the return device comprises a cam receiving a connecting pin, one of the cam or the connecting pin axially sliding during a recoil movement of the at least one movable cowl, and the other of the connecting pin or the cam being linked to the control sector.

11. The engine nacelle according to claim 1, wherein the return device comprises a cable fixed to the control sector in a transverse direction, passing from each side of the control sector by a pulley linked to the at least one movable cowl taking an axial direction rearwards on one side and forwards on the other side, to then be fixed to the fixed portion.

12. The engine nacelle according to claim 1, wherein the return device is controlled directly by movement of the movable cowl.

13. The engine nacelle according to claim 1, wherein the control sector further includes an elongated and curved bar held inside the movable cowl in the transverse plane by one or more guides.

14. The engine nacelle according to claim 1, wherein the return device includes a return plate spaced apart from the fixed portion of the engine nacelle and the control sector and pivotable relative to the fixed portion and the control sector, and wherein pivoting of the return plate relative to the fixed portion of the engine nacelle causes the return plate to pivot relative to the control sector and changes a distance of the return plate from the fixed portion of the engine nacelle and from the control sector.

15. An engine nacelle of a bypass turbojet engine type disposed along a main axis, the engine nacelle comprising:
a thrust reverser system having at least one movable cowl movable axially between a direct jet front position and a reverse jet rear position which tilts a plurality of pivoting flaps while at least partially closing an annular flow path, and which opens lateral openings of the annular flow path upstream of the plurality of pivoting flaps, equipped with thrust reverser cascades returning a cold air flow towards outside forwards, wherein each movable cowl includes:
a control sector sliding in a transverse plane relative to the main axis;
a return device connecting a fixed portion of the engine nacelle to the control sector to slide the control sector to a reversal position when the at least one movable cowl is recoiled; and
a plurality of flap tie-rods connecting the control sector to the plurality of pivoting flaps disposed in front of the at least one movable cowl and movable by the control sector, the plurality of flap tie-rods tilting the plurality of pivoting flaps by closing the annular flow path upon movement by the control sector when sliding the control sector towards the reversal position,
wherein the return device comprises a return plate fixed to the at least one movable cowl by a cowl pivot, the return plate being connected to the fixed portion of the nacelle by a primary tie-rod and to the control sector by a secondary tie-rod.

16. The engine nacelle according to claim 15, wherein each flap tie-rod includes a play take-up system comprising at least two axial portions sliding relative to each other, equipped with an intermediate spring.

17. The engine nacelle according to claim 15, wherein the control sector includes guides fixed to the at least one movable cowl, allowing a movement of the control sector according to a circumferential direction.

18. The engine nacelle according to claim 15, wherein each control sector includes the return device at each end of the control sector.

19. The engine nacelle according to any claim 15, wherein the return device is controlled directly by movement of the movable cowl.

20. The engine nacelle according to claim 15, wherein the control sector further includes an elongated and curved bar held inside the movable cowl in the transverse plane by one or more guides.

21. The engine nacelle according to claim 15, wherein the return plate is spaced apart from the fixed portion of the engine nacelle and the control sector and pivotable relative to the fixed portion and the control sector, and wherein pivoting of the return plate relative to the fixed portion of the engine nacelle causes the return plate to pivot relative to the control sector and changes a distance of the return plate from the fixed portion of the engine nacelle and from the control sector.

22. An engine nacelle of a bypass turbojet engine type disposed along a main axis, the engine nacelle comprising:
a thrust reverser system having at least one movable cowl movable axially between a direct jet front position and a reverse jet rear position which tilts a plurality of pivoting flaps while at least partially closing an annular flow path, and which opens lateral openings of the annular flow path upstream of the plurality of pivoting flaps, equipped with thrust reverser cascades returning a cold air flow towards outside forwards, wherein each movable cowl includes:
a control sector sliding in a transverse plane relative to the main axis;
a return device connecting a fixed portion of the engine nacelle to the control sector to slide the control sector to a reversal position when the at least one movable cowl is recoiled; and
a plurality of flap tie-rods connecting the control sector to the plurality of pivoting flaps disposed in front of the at least one movable cowl and movable by the control sector, the plurality of flap tie-rods tilting the plurality of pivoting flaps by closing the annular flow path upon movement by the control sector when sliding the control sector towards the reversal position,
wherein the return device includes a return plate spaced apart from the fixed portion of the engine nacelle and the control sector and pivotable relative to the fixed portion and the control sector, and wherein pivoting of the return plate relative to the fixed portion of the engine nacelle causes the return plate to pivot relative to the control sector and changes a distance of the return plate from the fixed portion of the engine nacelle and from the control sector.

23. The engine nacelle according to claim 22, wherein each flap tie-rod includes a play take-up system comprising at least two axial portions sliding relative to each other, equipped with an intermediate spring.

24. The engine nacelle according to claim 22, wherein the control sector includes guides fixed to the at least one movable cowl, allowing a movement of the control sector according to a circumferential direction.

25. The engine nacelle according to claim 22, wherein each control sector includes the return device at each end of the control sector.

26. The engine nacelle according to claim 22, wherein the return device is controlled directly by movement of the movable cowl.

27. The engine nacelle according to claim 22, wherein the control sector further includes an elongated and curved bar held inside the movable cowl in the transverse plane by one or more guides.

* * * * *